(12) United States Patent
Aikens et al.

(10) Patent No.: US 8,400,258 B2
(45) Date of Patent: Mar. 19, 2013

(54) METHOD OF REMOTELY CONFIGURING A CONTROLLER RESPONSIVE TO WIRELESS SIGNALS

(75) Inventors: Brian Aikens, Garibaldi Highlands (CA); Loren Parfitt, Squamish (CA)

(73) Assignee: Echoflex Solutions, Inc., Squamish, B.C. (CA)

( * ) Notice: Subject to any disclaimer, the term of this patent is extended or adjusted under 35 U.S.C. 154(b) by 993 days.

(21) Appl. No.: 12/433,170

(22) Filed: Apr. 30, 2009

(65) Prior Publication Data

US 2010/0277270 A1 Nov. 4, 2010

(51) Int. Cl.
*G05B 23/02* (2006.01)
*G05B 11/01* (2006.01)

(52) U.S. Cl. ............... 340/3.7; 340/12.23; 340/12.24; 340/12.5; 340/12.55; 340/12.28

(58) Field of Classification Search ............. 340/3.7, 340/999; 315/291, 313, 194, 308, 320; 700/7, 700/17, 19, 23, 87
See application file for complete search history.

(56) References Cited

U.S. PATENT DOCUMENTS

| | | | | |
|---|---|---|---|---|
| 4,800,804 | A * | 1/1989 | Symington | 454/257 |
| 5,455,464 | A * | 10/1995 | Gosling | 307/31 |
| 5,489,827 | A * | 2/1996 | Xia | 315/294 |
| 6,801,003 | B2 * | 10/2004 | Schanberger et al. | 315/291 |
| 7,233,831 | B2 * | 6/2007 | Blackwell | 700/17 |
| 7,405,524 | B2 * | 7/2008 | Null et al. | 315/308 |
| 7,924,174 | B1 * | 4/2011 | Gananathan | 340/999 |
| 2007/0273509 | A1 | 11/2007 | Gananathan | |
| 2007/0273539 | A1 | 11/2007 | Gananathan | |
| 2010/0201267 | A1 | 8/2010 | Bourquin et al. | |

FOREIGN PATENT DOCUMENTS

WO 2009003279 A1 8/2009

OTHER PUBLICATIONS

International Preliminary Report on Patentability, PCT/CA2010/000593, dated Nov. 11, 2011.
International Search Report mailed Sep. 3, 2010.

* cited by examiner

*Primary Examiner* — Nam V Nguyen
(74) *Attorney, Agent, or Firm* — Michael Best & Friedrich LLP

(57) ABSTRACT

A method of remotely configuring a controller responsive to wireless signals includes entering a controller programming mode from a regular mode in response to at least one wireless signal corresponding to a first click pattern from a switch. The controller provides a first notification to indicate a first selected configurable feature of the controller. Each of a plurality of configurable features of the controller has a different assigned notification. The controller provides a second notification to indicate a second selected configurable feature in response to at least one wireless signal corresponding to a second click pattern from the switch. The method also includes exiting the programming mode. The notification may be a flashing of lights, a dimming of lights, an audible sound, an adjustment of a damper position, or a combination of these things.

22 Claims, 8 Drawing Sheets

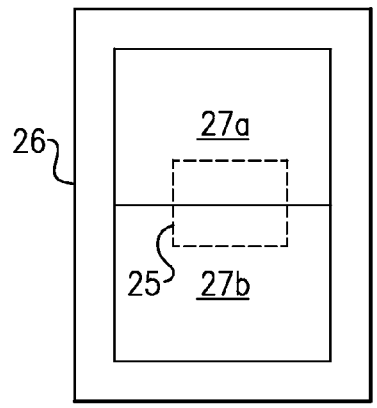
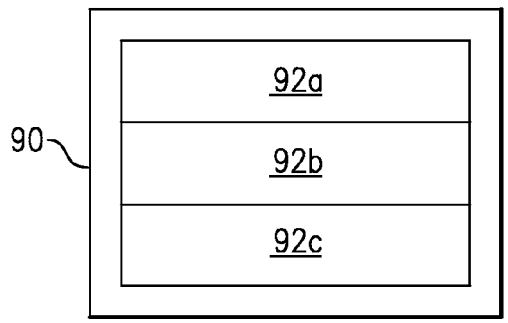
FIG.1a
FIG.1b
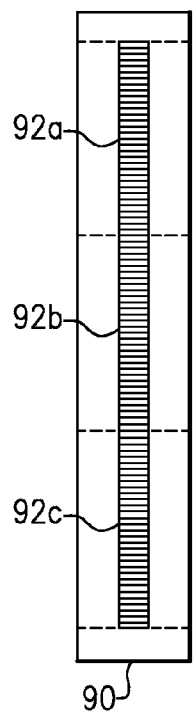
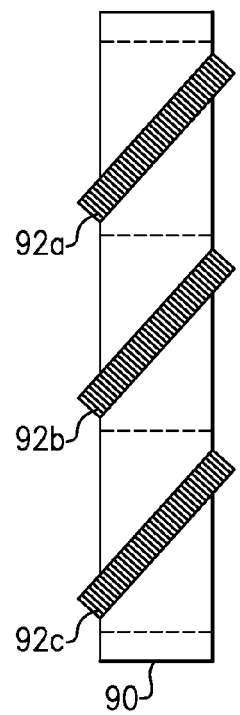
FIG.1c
FIG.1d

METHOD OF REMOTELY CONFIGURING A CONTROLLER RESPONSIVE TO WIRELESS SIGNALS

BACKGROUND OF THE INVENTION

This application relates to configuring a wireless control system, and more particularly to remotely configuring various features of a wireless control system.

Controllers responsive to wireless signals are useful in various residential, commercial, and industrial settings. For example, commercially available wireless lighting systems exist in which a switch transmits a wireless signal to a controller, and the controller turns a load (e.g. a lighting load) ON or OFF in response to the wireless signal. These systems have required manual configuration of the controller, and thus have also required physical access to the controller.

SUMMARY OF THE INVENTION

According to one non-limiting embodiment, a method of remotely configuring a controller responsive to wireless signals includes entering a controller programming mode from a regular mode in response to at least one wireless signal corresponding to a first click pattern from a switch. The controller provides a first notification to indicate a first selected configurable feature of the controller. Each of a plurality of configurable features of the controller has a different assigned notification. The controller provides a second notification to indicate a second selected configurable feature in response to at least one wireless signal corresponding to a second click pattern from the switch. The method also includes exiting the programming mode. The notification may be a flashing of lights, a dimming of lights, an audible sound, an adjustment of a damper position, or a combination of these things.

These and other features of the present invention can be best understood from the following specification and drawings, the following of which is a brief description.

BRIEF DESCRIPTION OF THE DRAWINGS

FIG. 1a schematically illustrates a switch of FIG. 1.

FIG. 1b schematically illustrates a first view of a damper of FIG. 1 in a first position.

FIG. 1c schematically illustrates a second view of the damper of FIG. 1 in a second position.

FIG. 1d schematically illustrates the damper of FIG. 1 in a second position.

DETAILED DESCRIPTION OF THE PREFERRED EMBODIMENT

Figure 1:
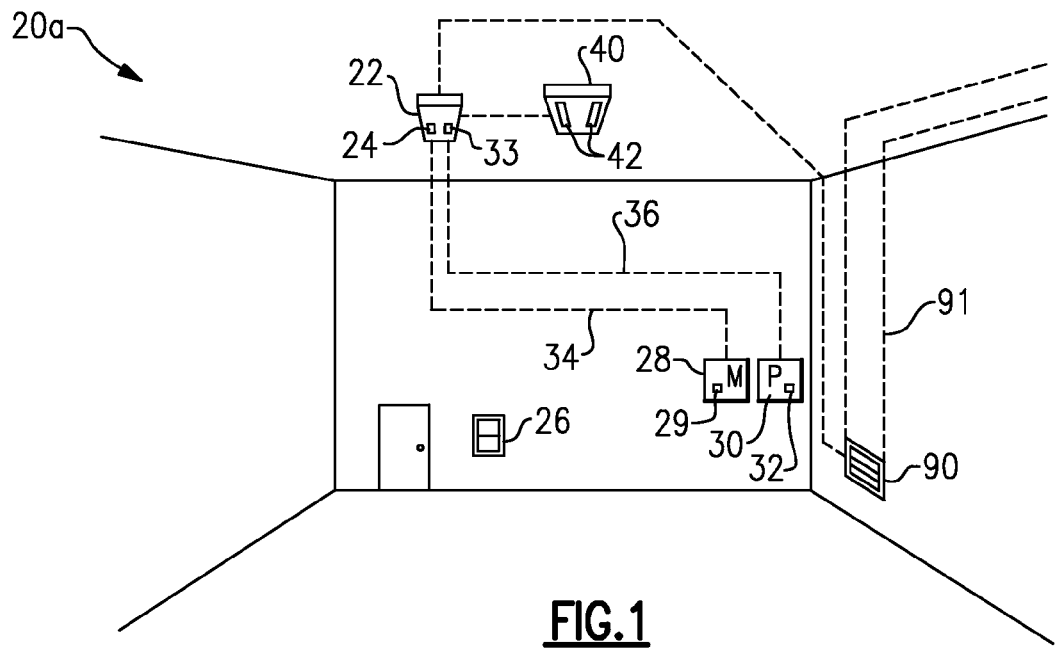
FIG. 1 schematically illustrates a first wireless control system, including a controller responsive to wireless control signals.

FIG. 1 schematically illustrates a wireless control system 20a. A controller 22 includes a receiver 24 that is operable to receive wireless control signals from a switch 26, a motion sensor 28, or a photocell 30. However, it is also possible that the motion sensor 28 and photocell 30 could communicate with the receiver 24 through wired (or "contact closure") connections 34, 36. The controller 22 is operable to control a load in response to the wireless (or wired) control signals. In one example the load is a ballast 40 that the controller 22 controls to selectively turn a lighting load 42 ON or OFF. In one example the lighting load 42 is dimmable, and the controller 22 is operable to dim the lighting load 22 up or down. In one example the load is a damper 90 for a heating, ventilating and air conditioning ("HVAC") air duct 91 (see FIGS. 1b-c). Of course, other loads could also be used.

Figure 2:
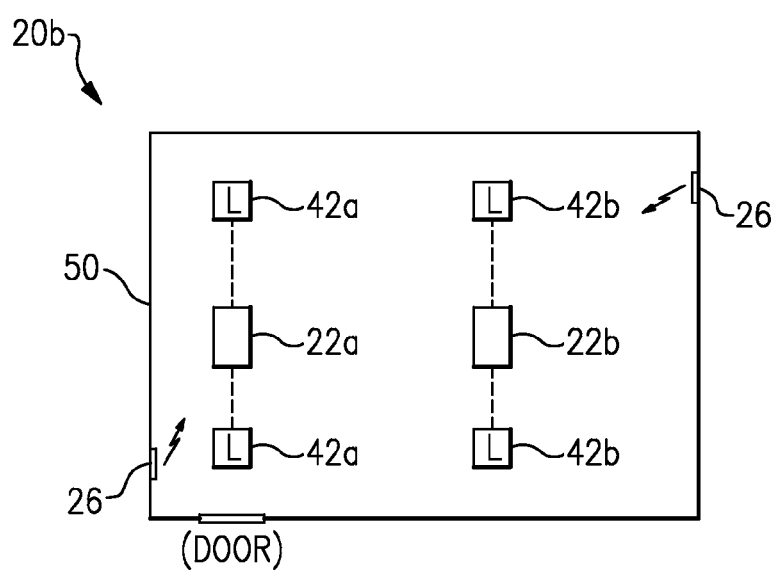
FIG. 2 schematically illustrates a second wireless control system including a plurality of controllers responsive to wireless control signals.

The switch 26, motion sensor 28, and photocell 30 may be energy harvesting devices operable to harvest energy to transmit its wireless control signal. The switch 26 may be a rocker switch including an ON portion 27a and an OFF portion 27b and including an energy harvester 25 (e.g. Product Number PTM 200 or PCTM 200c from Enocean) operable to harvest mechanical energy to transmit the wireless control signal in response to an actuation of one of the portions 27a-b (see FIG. 1a). The motion sensor 28 could correspond to SRMDS from Hardmeier. The photocell sensor 30 could correspond to model TAP-17 or TAP-17c from Echoflex. Of course these devices are only exemplary, and other switches, motion sensors, and photocells could be used. Also, other quantities of these devices 26, 28, 30 could be used. For example, as shown in FIG. 2, it is possible that a single building 50 can include a plurality of controllers 22a-b each coupled to a plurality of dimmable lighting loads 42a-b.

Figure 3:
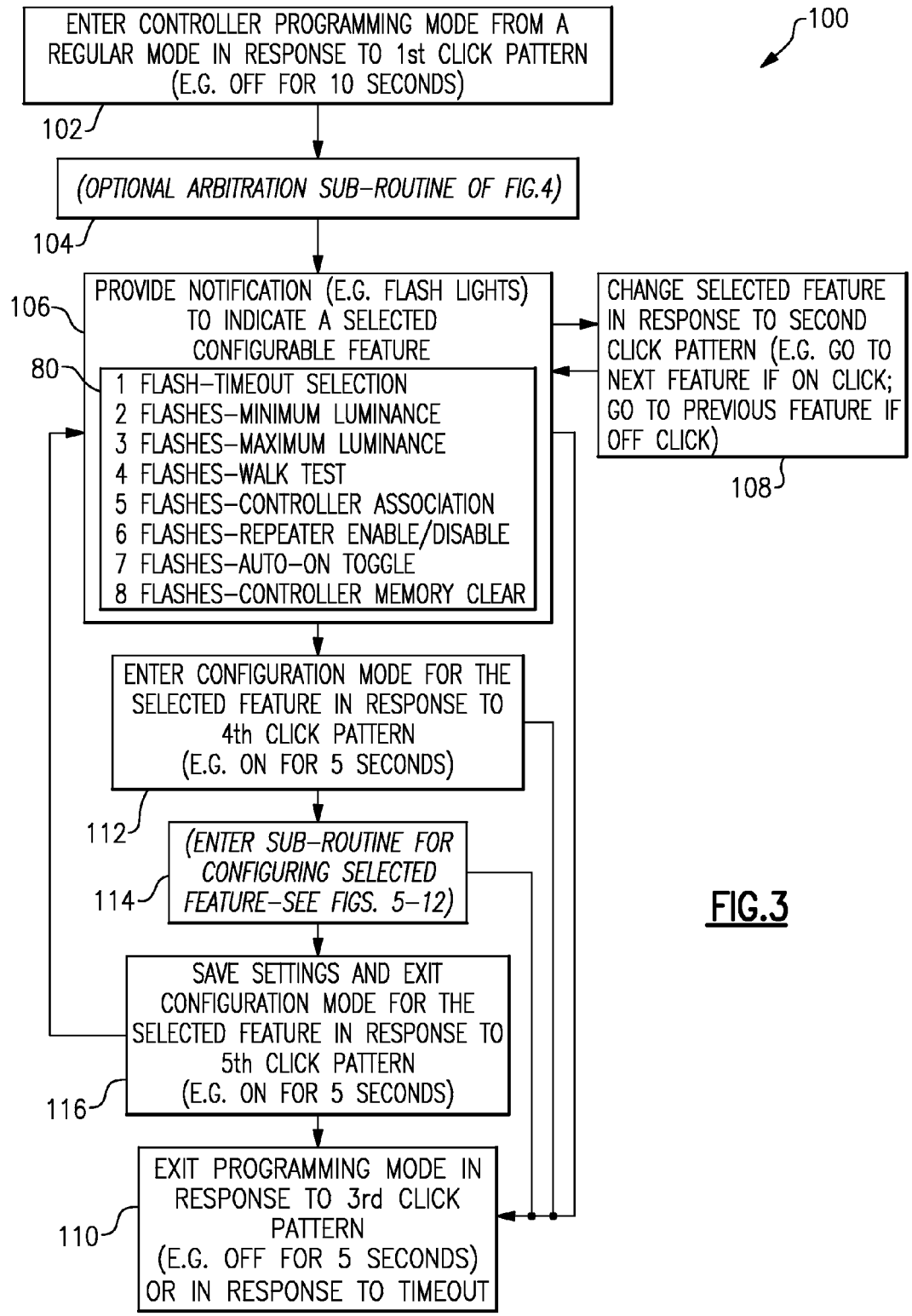
FIG. 3 schematically illustrates a method of remotely configuring the controller.

FIG. 3 schematically illustrates a method 100 of remotely configuring the controller 22 that has broad applications in environments in which it is difficult or inconvenient to access the controller 22. For example, as shown in FIG. 1, it is possible that the controller 22 can be remotely located from the switch 26, and can difficult to reach. In environments such as factories or other commercial or industrial facilities a controller 22 may similarly be far out of reach of an individual, even if the individual has access to a ladder. The method 100 enables an individual to conveniently and remotely configure the controller 22.

Referring to the method 100 FIG. 3, the controller 22 enters a programming mode from a regular mode in response to a wireless signal corresponding to a first click pattern (e.g. hold OFF for 10 seconds) from switch 26 (step 102). As will be discussed later, the controller 22 can optionally enter an arbitration sub-routine (step 104) if a user needs to select one of a plurality of controllers (see FIG. 4). However, if only one controller is present, step 104 would not be required.

In one example, the lighting load 42 is then flashed a quantity of times to indicate a selected configurable feature of the controller 22 (step 106). The flashing sequence is repeated until a user either selects another feature (step 108), exits the programming mode (step 110) or enters a configuration mode for the selected feature (step 112). An example list of configurable features and corresponding flash quantities is indicated by reference numeral 80. Of course this selection of features, and their order is only exemplary, and other features in different sequences could be used. Each of these features will be discussed in greater detail below. Also, the controller could use dimming to indicate features. For example, a first could use 10% brightness, a second feature could use 20% brightness, a third feature could use 30% brightness, etc. Also, the light could be flashed a quantity of times at a specified brightness.

Although the method 100 is schematically illustrated as using a light flashing notification in step 106, it is also possible that the controller 22 would use other notifications. For example, the controller 22 could use a speaker 33 to play sounds. Different features could, for example, repeat a sound clip (e.g. a beeping noise) a specified quantity of times. As another example, the controller 22 could play sounds having varying pitches to indicate different features.

Another example notification could include moving a position of a plurality of blade 92a-c of damper 90. For example, the controller 22 could move the blades 92a-c from a first position (see FIG. 1c) to a second position (see FIG. 1d) to notify a user of a selected feature (e.g. an HVAC feature). Of course, other quantities of blades, such as a single blade, could be used.

Also, the controller 22 could perform various combinations of light flashes, light dimming, playing audio sounds, and adjusting dampers to provide notifications.

If the selected configurable feature is not a desired feature, the controller 22 can change the selected feature in response to a second click pattern (step 108). In one example the second click pattern is a single ON or a single OFF click, such that a single ON click advances to a subsequent feature and a single OFF click advances to a previous feature. Thus, if the lights blink once to indicate that the "Timeout Selection" feature is selected, and a user clicks portion 27a of switch 26 to transmit an ON signal, the controller 22 will start repeatedly flashing lighting load 42 twice (step 106) to indicate that the "Minimum Luminance" feature is selected. Or, if the user clicks portion 27b of switch 26 to transmit an OFF signal, the controller 22 will start repeatedly flashing lighting load 42 eight times (step 106) to indicate that the "Controller Memory Clear" feature is selected.

If a user enters a third click pattern (e.g. OFF for five seconds) the controller 22 exits the programming mode, saves the user's changes, and returns to the regular mode (step 110). The third click pattern can be entered at any time during the programming mode to return to the regular mode. However, if the third click pattern was not entered and a user did nothing, the controller 22 would eventually timeout of the programming mode after a time period (e.g. 60 seconds) elapsed and return to the regular, operating mode.

If a user enters a fourth click pattern (e.g. ON for 5 seconds), the controller 22 enters a configuration mode for the selected feature (step 112), and enters a sub-routine for the selected feature (step 114). These sub-routines will be described in greater detail in FIGS. 5-12. The controller 22 exits the configuration mode (step 116) in response to a fifth click pattern (e.g. ON for 5 seconds), and returns to the selective flashing of step 106. Optionally, the controller 22 may confirm the exit from the configuration mode by turning OFF the lights 42 for a time period (e.g. 3 seconds) followed by a pause before returning to the selective flashing of step 106.

Figure 4:
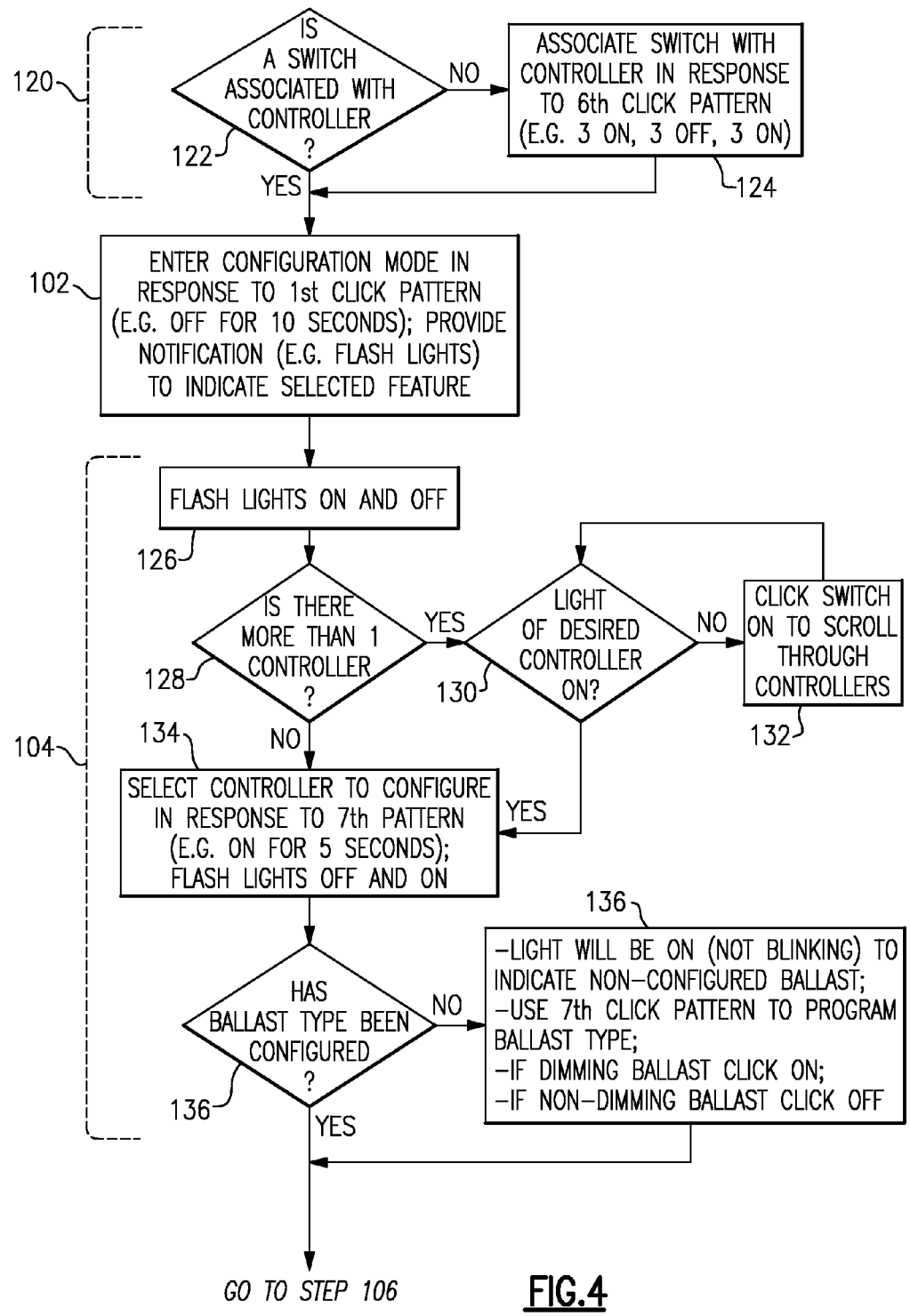
FIG. 4 schematically illustrates an arbitration sub-routine of the method of FIG. 1.

FIG. 4 schematically illustrates an arbitration sub-routine 104 of the method 100 of FIG. 3, which is useful in systems such as the wireless control system 20b in which there are multiple controllers 22a-b. FIG. 4 also illustrates an optional preliminary configuration sub-routine 120. If the controller 22 has not yet been associated with any switches 26 (step 122), the controller becomes associated with switch 26 in response to a sixth click pattern (e.g. 3 ON clicks, 3 OFF clicks, 3 ON clicks). However, if the controller 22 is already associated with a switch the preliminary configuration sub-routine 120 need not be performed.

Referring to the arbitration sub-routine 104, a controller, such as controller 22a flashes its lighting load ON and OFF (step 126). A check is performed to see if there is more than one controller (step 128). If there is more than one controller, a check is performed to see if the lighting load associated with a desired controller is ON (step 130). If, for example the lights coupled to controller 22a were flashing, and a user wished to configure controller 22b, the user could click ON to scroll to the next controller (step 132). Once the light of a desired controller is flashing ON and OFF, the controller is selected through a seventh click pattern (e.g. ON for 5 seconds), and the lights will continue to flash ON and OFF. A check is performed to determine if a ballast coupled to the flashing lighting load has been configured (step 136). The controller 22 indicates that the ballast has not been configured by leaving the lighting load coupled to the ballast ON (not flashing). The seventh click pattern is then used to program the ballast type (e.g. ON for 5 seconds). If the ballast is a dimming ballast the user would click ON, and if the ballast is a non-dimming ballast the user would click OFF (step 136). Then the controller 22 then proceeds to step 106.

Figure 5:
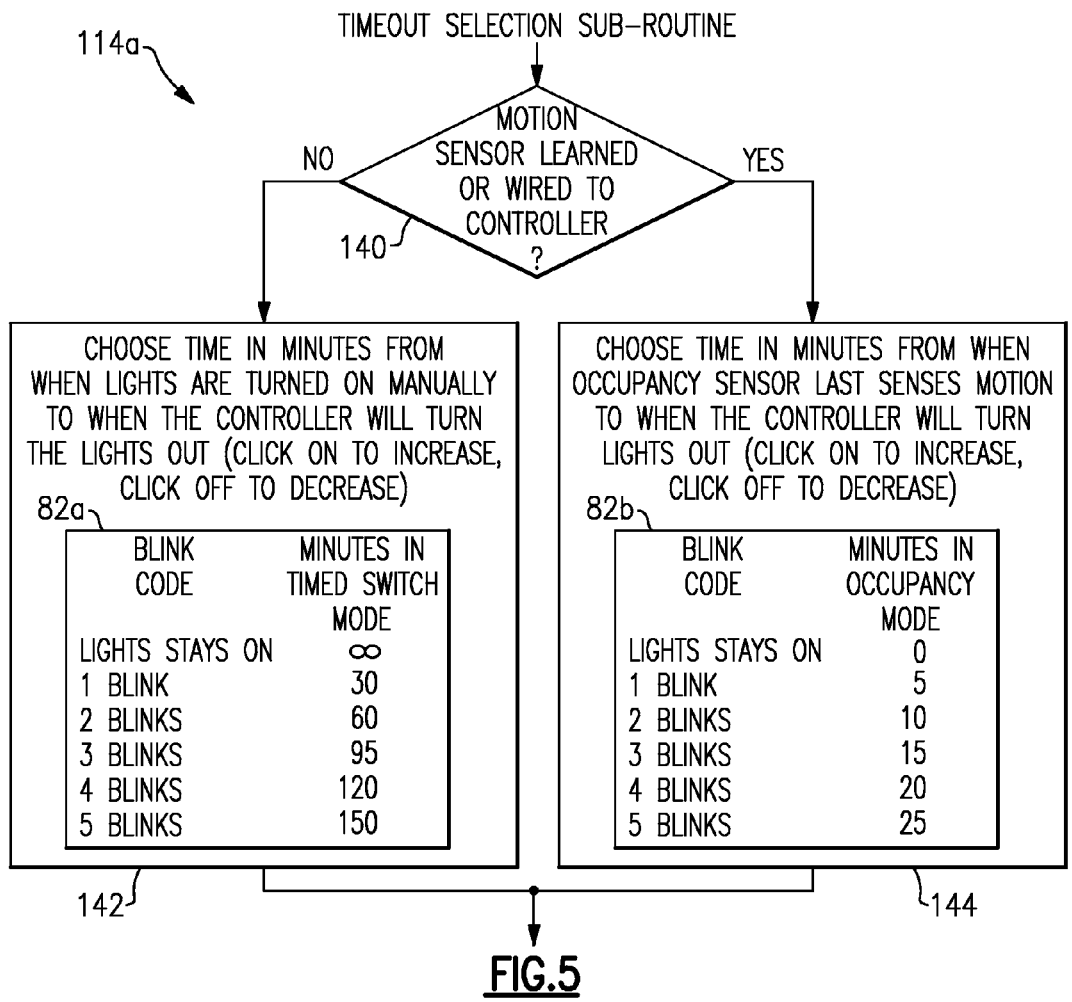
FIG. 5 schematically illustrates a timeout selection sub-routine of the method of FIG. 1.

The sub-routines 114a-h for each of a plurality of features will now be described. FIG. 5 schematically illustrates a timeout selection sub-routine 114a of the method 100 of FIG. 1, in which a user can select an amount of time after which the controller 22 will turn the lighting load OFF after being manually turned ON (step 142) or after detecting occupancy via motion sensor 28 (step 144). This timeout feature can yield energy savings by preventing wasted electricity when a building is not occupied.

A check is performed to determine if a motion sensor 28 has been learned or wired to the controller 22 (step 140). The term "learned" refers to the controller 22 being responsive to signals from the motion sensor 28 when the controller 22 is in the regular mode. If the motion sensor has not been learned or wired to the controller 22, the controller 22 flashes the lighting load 42 a predetermined quantity of times to indicate a selected timeout preset (step 142) as shown in table 82a. The user can increase or decrease the timeout preset by clicking the switch 26 ON or OFF. Thus, a user can configure the receiver 22 to turn lights 42 OFF after 30, 60, 90, 120 or 150 minutes after being turned ON or to never turn OFF (∞ minutes to timeout).

If the motion sensor has been learned or wired to the controller 22, the controller 22 flashes the lighting load 42 a predetermined quantity of times to indicate a selected timeout preset (step 144) as shown in table 82b. The user can increase or decrease the timeout preset by clicking the switch 26 ON or OFF. Thus, a user can configure the receiver 22 to turn the light 42 OFF 0, 5, 10, 15, 20 or 25 minutes after motion has been detected. Of course, the table 82a-b are only exemplary, and other time presets would be possible.

Figure 6:
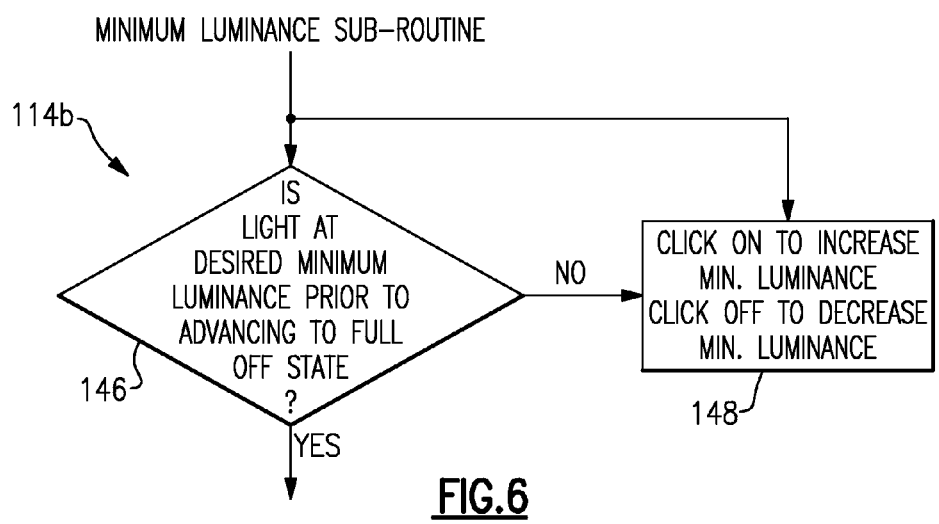
FIG. 6 schematically illustrates a minimal luminance sub-routine of the method of FIG. 1.

FIG. 6 schematically illustrates a minimal luminance sub-routine 114b of the method 100 of FIG. 1. A check is performed to determine if the light 42 is at a desired minimum luminance beyond which the light 42 will turn OFF instead of further dimming down (step 146). If the desired minimum luminance is not selected, a user can click the switch ON to increase the minimum luminance, or click the switch OFF to decrease the minimum luminance (step 148). One the desired luminance is selected, the user may proceed.

Figure 7:
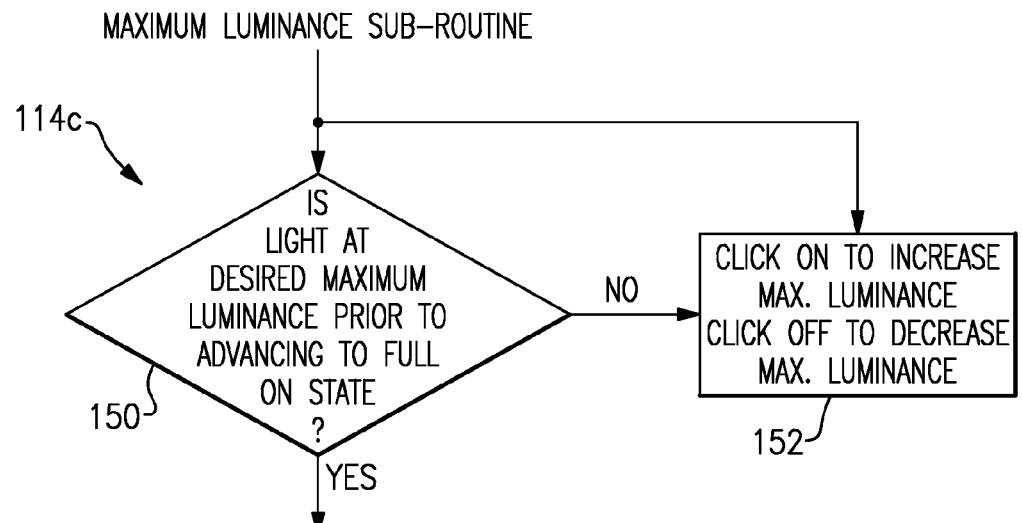
FIG. 7 schematically illustrates a maximum luminance sub-routine of the method of FIG. 1.

FIG. 7 schematically illustrates a maximum luminance sub-routine 114*c* of the method 100 of FIG. 1. A check is performed to determine if the light 42 is at a desired maximum luminance beyond which the light 42 will turn ON instead of further dimming up (step 150). If the desired maximum luminance is not selected, a user can click the switch ON to increase the maximum luminance, or click the switch OFF to decrease the maximum luminance (step 152). One the desired luminance is selected, the user may proceed.

Figure 8:
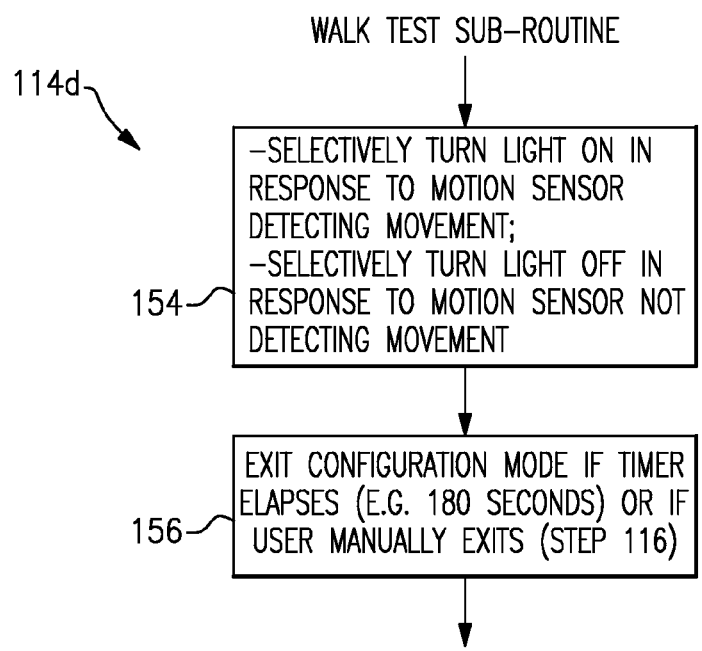
FIG. 8 schematically illustrates a walk test sub-routine of the method of FIG. 1.

FIG. 8 schematically illustrates a walk test sub-routine 114*d* of the method of FIG. 1. The walk test enables a viewer to test a range of sensitivity of motion sensor 28. The controller 22 turns the light 42 ON in response to the motion sensor 28 detecting motion, and the controller 22 turns the light 42 OFF in response to the motion sensor not detecting movement (step 154). The controller 22 exits the walk test (step 156) after a time period elapses (e.g. 180 seconds) or if a user manually exits, as described in step 116.

Figure 9:
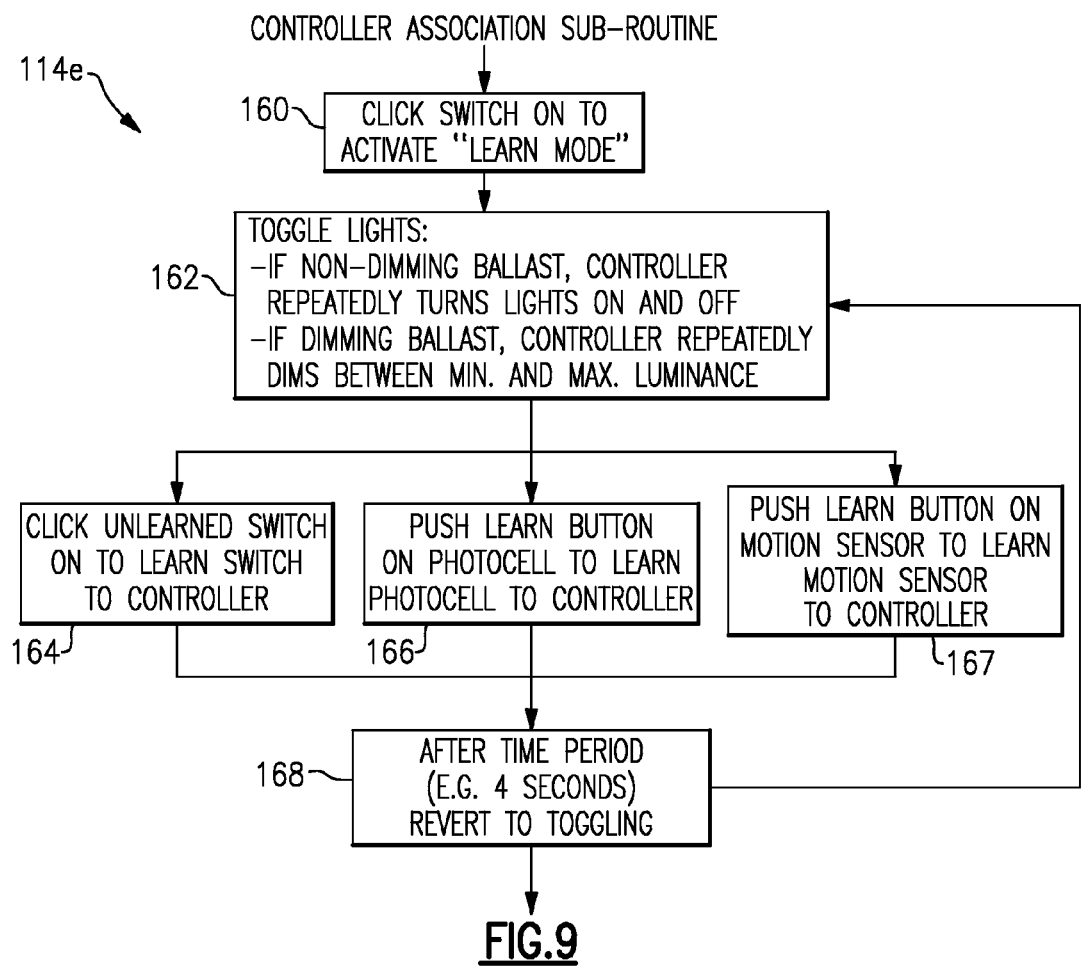
FIG. 9 schematically illustrates a controller association sub-routine of the method of FIG. 1.

FIG. 9 schematically illustrates a controller association sub-routine 114*e* of the method of FIG. 1. The controller 22 enters a "learn mode" in response to an ON click of the switch 26 (step 160). The controller 22 toggles the lights 42 depending on a type of ballast 40 associated with the lights 42 (step 162). If the ballast 40 is a non-dimming ballast the lights 42 are repeatedly turned ON and OFF, and if the ballast 40 is a dimming ballast the lights 42 are repeatedly dimmed between a maximum and a minimum luminance. The minimum could correspond to a full OFF or to the minimum luminance of the sub-routine 114*b*, and the maximum could correspond to a full ON or to the maximum luminance of the sub-routine 114*c*.

The controller 22 becomes associated with, or "learns", a new switch in response to an ON click from the new switch (step 164). The controller 22 learns a photocell 30 in response to a learn button 32 of the photocell 30 being actuated (step 166). The controller 22 learns a motion sensor 28 in response to a learn button 29 of the motion sensor 28 being actuated (step 167). After a time period (e.g. 4 seconds) the controller 22 reverts to the toggling of step 162 (step 168).

Figure 10:
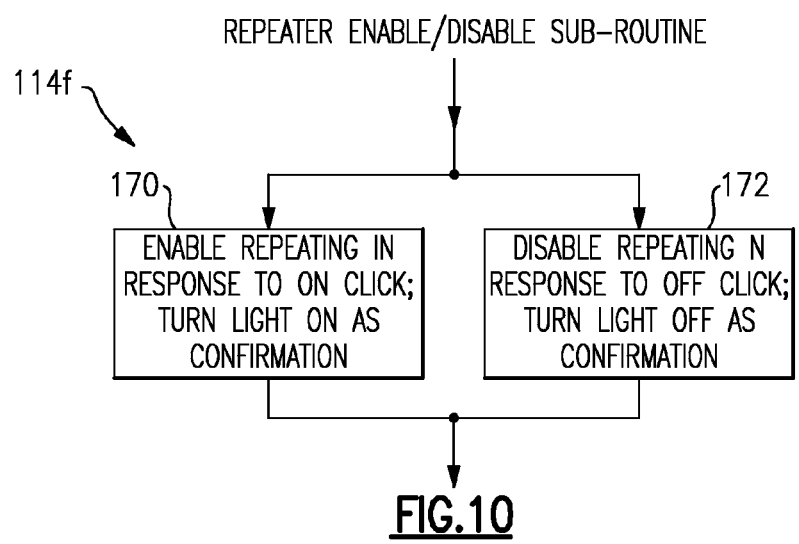
FIG. 10 schematically illustrates a repeater enable/disable sub-routine of the method of FIG. 1.

FIG. 10 schematically illustrates a repeater enable/disable sub-routine 114*f* of the method of FIG. 1, by which a user can turn ON or OFF repeating functionality of the controller 22. For example, if a user wanted the controller 22*a* to repeat signals received to the controller 22*b*, the user could turn ON the repeating functionality with an ON flick (step 170), and the controller 22*a* would turn on lights 42*a* as a confirmation. If the user did not want the controller 22*a* to repeat signals received to controller 22*b*, the user could turn OFF the repeating functionality with an OFF click (step 172) and the controller 22*a* would turn OFF lights 42*a* as a confirmation.

Figure 11:
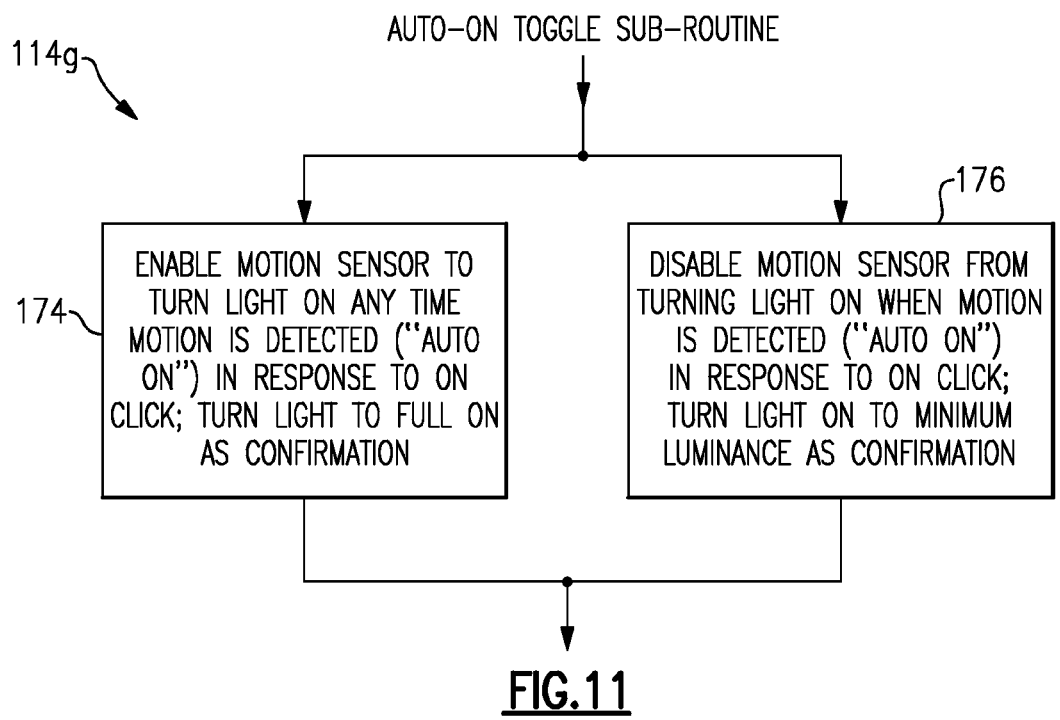
FIG. 11 schematically illustrates an auto-ON toggle sub-routine of the method of FIG. 1.

FIG. 11 schematically illustrates an auto-ON toggle sub-routine 114*g* of the method of FIG. 1. This sub-routine 114*g* enables or disables motion sensor 28 from turning lights 42 ON or OFF. If the user wanted the motion sensor 28 to turn the lights 42 ON when motion is detected, the user could provide an ON click (step 174), and the controller 22 could respond by turning lights 42 to a full ON as a confirmation. If the user did not want the motion sensor 28 to turn the lights 42 ON when motion is detected, they could provide an OFF click (step 176), and the controller 22 could respond by turning lights 42 to a minimum luminance as confirmation. The minimum luminance is a full OFF for a non-dimming ballast, and is the minimum luminance of sub-routine 114*b* for a dimming ballast.

Figure 12:
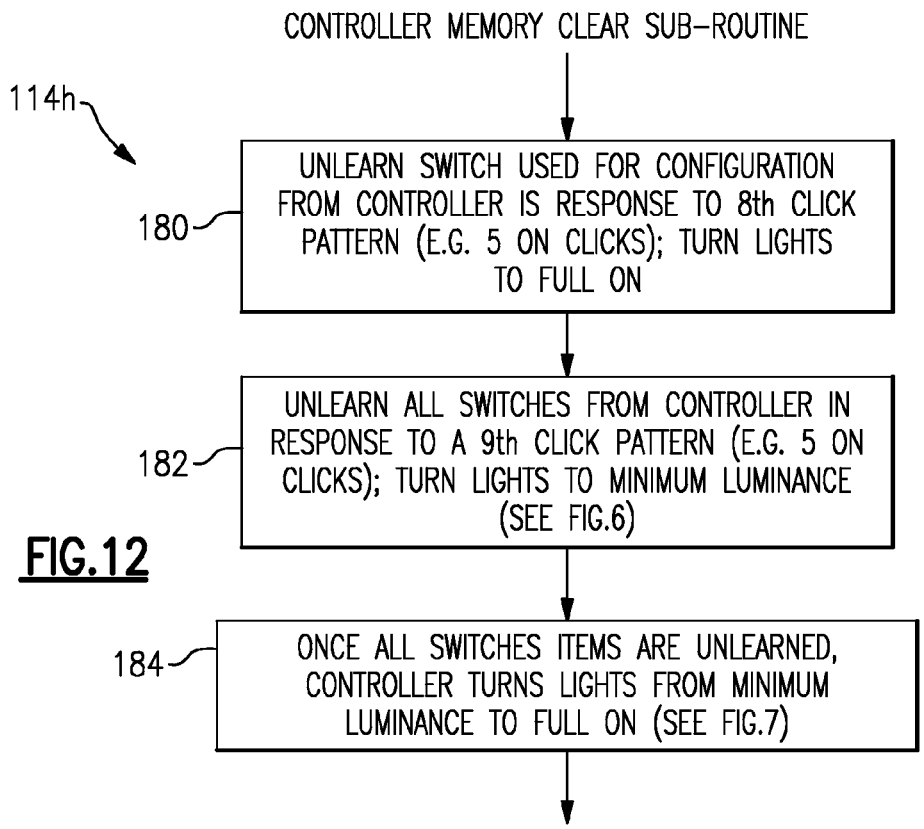
FIG. 12 schematically illustrates a controller memory clear sub-routine of the method of FIG. 1.

FIG. 12 schematically illustrates a controller memory clear sub-routine 114*h* of the method of FIG. 1 through which the controller 22 can be un-associated or "un-learned" from one or more switches 54, motion sensors 28, or photocells 30. The controller 22 is un-learned from a switch used for configuration (i.e. used to enter programming mode, select sub-routine 114*h*, etc.) in response to an eighth click pattern (e.g. 5 ON clicks) and the controller 22 turns lights 42 to a full ON as a confirmation (step 180).

The controller 22 is un-learned from all switches in response to an ninth click pattern (e.g. 5 ON clicks) and the controller 22 turns lights 42 to a minimum luminance as confirmation (step 180). The minimum luminance is a full OFF for a non-dimming ballast, and is the minimum luminance of sub-routine 114*b* for a dimming ballast. Step 182 could also include unlearning the receiver from all motion sensors 28 or photocells 30 that are not hard-wired to the receiver 22. Once all switches are un-learned, the controller 22 turns lights 42 to a full ON as a confirmation.

As described above, any of the sub-routines 114*a-h* can be exited via the fifth click pattern of step 116. Also, although specific click patterns have been disclosed throughout this application, it is understood that all click patterns described throughout this patent application are only exemplary, and that other click patterns could be used.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of remotely configuring a controller responsive to wireless signals, comprising:
   entering a controller programming mode from a regular mode in response to at least one wireless signal corresponding to a first click pattern received via a single switch having an ON state and an OFF state;
   selectively providing a first notification to indicate a first selected configurable feature of the controller, wherein each of a plurality of configurable features of the controller has a different assigned notification;
   selectively providing a second notification to indicate a second selected configurable feature in response to at least one wireless signal corresponding to a second click pattern received via the switch,
      wherein the first click pattern and the second click pattern are selected from a plurality of click patterns recognizable by the switch, the plurality of click patterns being defined by at least one of a number of actuations of the switch to the ON state, a number of actuations of the switch to the OFF state, a length of time in the ON state, and a length of time in the OFF state; and
   exiting the controller programming mode.

2. The method of claim 1, wherein one of the plurality of configurable features is a time period after which a lighting load coupled to the controller will turn OFF if a motion sensor in communication with the controller detects no movement.

3. The method of claim 1 wherein one of the plurality of configurable features is a minimum luminance a dimmable lighting load coupled to the controller will reach before advancing to a full OFF state.

4. The method of claim 1, wherein one of the plurality of configurable features is a maximum luminance a dimmable lighting load coupled to the controller will reach before advancing to a full ON state.

5. The method of claim 1, wherein one of the plurality of configurable features is a walk test in which the controller turns a light in a lighting load coupled to the controller ON when a motion sensor associated with the light detects motion, and in which the controller turns the associated light in the lighting load OFF when the motion sensor no longer detects motion.

6. The method of claim 1, wherein the switch is a first switch, and wherein one of the plurality of configurable features is a toggle to enable or disable the controller from being responsive to wireless signals received from a second switch while the controller is in the regular mode.

7. The method of claim 1, wherein one of the plurality of configurable features is a toggle to enable or disable the controller from retransmitting wireless signals to other controllers.

8. The method of claim 1, wherein one of the plurality of configurable features is a toggle to enable or disable a motion sensor in communication with the controller from being operable to turn ON a lighting load coupled to the controller.

9. The method of claim 1, wherein one of the plurality of configurable features is a clearing of a memory of the controller, wherein the memory stores an identification of switches from which the controller has been programmed to response to wireless signal commands.

10. The method of claim 1, wherein said step of exiting the controller programming mode is performed in response to at least one wireless signal corresponding to a third click pattern received via the switch.

11. The method of claim 1, wherein at least one of the notifications corresponds to adjusting a lighting load coupled to the controller to a specified brightness.

12. The method of claim 1, wherein at least one of the notifications corresponds to flashing a lighting load coupled to the controller a specified quantity of times.

13. The method of claim 12, wherein the first notification includes flashing a lighting load coupled to the controller a first quantity of times, wherein the second notification includes flashing the lighting load a second quantity of times, wherein the second quantity of flashes is greater than the first quantity of flashes if the second click pattern corresponds to an ON actuation of the switch, and wherein the second quantity of flashes is lower than the first quantity of flashes if the second click pattern corresponds to an OFF actuation of the switch.

14. The method of claim 1, further comprising: entering a configuration mode for the selected configurable feature in response to at least one wireless signal corresponding to a third click pattern received via the switch; and exiting the configuration mode for the selected configurable feature in response to at least one wireless signal corresponding to a fourth click pattern received via the switch.

15. The method of claim 1, further comprising: associating the switch with the controller in the regular mode in response to a third click pattern and in response to the controller not being associated with any switches, wherein the third click pattern includes at least three ON actuations of the switch followed or preceded by at least three OFF actuations of the switch.

16. The method of claim 1, further comprising: entering an arbitration mode in response to a building including more than one controller; flashing a lighting load coupled to indicate a selected controller; and confirming the controller selection in response to a third click pattern.

17. The method of claim 1, wherein the switch is an energy-harvesting switch.

18. The method of claim 17, wherein the switch is a momentary-action rocker switch.

19. The method of claim 1, wherein the switch is a momentary-action rocker switch.

20. A method of remotely configuring a controller responsive to wireless signals, comprising:
    entering a controller programming mode from a regular mode in response to at least one wireless signal corresponding to a first click pattern received via a single switch having an ON state and an OFF state;
    selectively providing a first audio notification to indicate a first selected configurable feature of the controller, wherein each of a plurality of configurable features of the controller has a different assigned audio notification;
    selectively providing a second audio notification of times to indicate a second selected configurable feature in response to at least one wireless signal corresponding to a second click pattern received via the switch,
        wherein the first click pattern and the second click pattern are selected from a plurality of click patterns recognizable by the switch, the plurality of click patterns being defined by at least one of the number of actuations of the switch to the ON state, the number of actuations of the switch to the OFF state, the length of time in the ON state, and the length of time in the OFF state; and
    exiting the controller programming mode.

21. The method of claim 20, wherein each of the assigned audio notifications includes a varying quantity of sounds, sounds having varying pitches, or both.

22. A method of remotely configuring a controller responsive to wireless signals, comprising:
    entering a controller programming mode from a regular mode in response to at least one wireless signal corresponding to a first click pattern received via a single switch having an ON state and an OFF state;
    selectively moving a damper to a first position to indicate a first selected configurable feature of the controller, wherein each of a plurality of configurable features of the controller has a different assigned damper position;
    selectively moving the damper to a second position to indicate a second selected configurable feature in response to at least one wireless signal corresponding to a second click pattern received via the switch,
        wherein the first click pattern and the second click pattern are selected from a plurality of click patterns recognizable by the switch, the plurality of click patterns being defined by at least one of the number of actuations of the switch to the ON state, the number of actuations of the switch to the OFF state, the length of time in the ON state, and the length of time in the OFF state; and
    exiting the controller programming mode.

* * * * *